United States Patent
Chen

(10) Patent No.: US 11,741,450 B2
(45) Date of Patent: *Aug. 29, 2023

(54) SYSTEM, METHOD, AND COMPUTER PROGRAM PRODUCT FOR CUSTOMIZING FUNCTIONS OF A POINT-OF-SALE TERMINAL

(71) Applicant: Visa International Service Association, San Francisco, CA (US)

(72) Inventor: Yuexi Chen, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 168 days.

This patent is subject to a terminal disclaimer.

(21) Appl. No.: 17/314,241

(22) Filed: May 7, 2021

(65) Prior Publication Data

US 2021/0264397 A1 Aug. 26, 2021

Related U.S. Application Data

(63) Continuation of application No. 16/240,948, filed on Jan. 7, 2019, now Pat. No. 11,037,123.

(51) Int. Cl.
*G06Q 20/20* (2012.01)
*G06F 9/445* (2018.01)
*G06Q 30/0238* (2023.01)
*G06Q 20/40* (2012.01)

(52) U.S. Cl.
CPC ....... *G06Q 20/204* (2013.01); *G06F 9/44584* (2013.01); *G06Q 20/4014* (2013.01); *G06Q 30/0238* (2013.01)

(58) Field of Classification Search
CPC ........ G06Q 20/40; G06Q 20/32; G06Q 30/00; G06Q 20/38; G06Q 30/02; G06F 9/445; G06F 13/00; G07F 7/08; G07F 7/10
USPC ................ 705/14.14, 14.26, 14.38, 26.1, 39; 235/376, 380, 487, 492
See application file for complete search history.

(56) References Cited

U.S. PATENT DOCUMENTS

| | | | |
|---|---|---|---|
| 6,450,407 B1 | 9/2002 | Freeman et al. | |
| 6,575,372 B1 | 6/2003 | Everett et al. | |
| 8,196,131 B1* | 6/2012 | von Behren | G06Q 20/382 |
| | | | 705/64 |
| 8,589,335 B2 | 11/2013 | Smith et al. | |
| 9,131,012 B2 | 9/2015 | Pi Farias | |

(Continued)

OTHER PUBLICATIONS

"EMV Issuer scripts and how do they work", https://www.eftlab.co.uk/index.php/site-map/our-articles/318-emv-issuer-scripts.

*Primary Examiner* — Olusegun Goyea
(74) *Attorney, Agent, or Firm* — THE WEBB LAW FIRM

(57) ABSTRACT

Described are a system, method, and computer program product for customizing functions of a point-of-sale (POS) terminal. The method includes receiving payment device data from an electronic payment device of a user during a payment transaction between the user and a merchant. The method also includes receiving at least one script for execution on the POS terminal from the electronic payment device. The at least one script is associated with a digital signature. The method further includes verifying the at least one script based on the digital signature of the at least one script and executing the at least one script on the POS terminal to cause an action associated with a user interaction with the POS terminal to be performed.

14 Claims, 4 Drawing Sheets

(56) References Cited

U.S. PATENT DOCUMENTS

| | | | |
|---|---|---|---|
| 9,369,664 B1* | 6/2016 | Hunt | G09B 5/06 |
| 2002/0069169 A1* | 6/2002 | Sukeda | G07F 7/025 |
| | | | 705/41 |
| 2003/0204441 A1 | 10/2003 | Ellis et al. | |
| 2010/0211504 A1 | 8/2010 | Aabye et al. | |
| 2012/0066773 A1* | 3/2012 | Weisberger | G06F 21/6209 |
| | | | 726/29 |
| 2014/0222594 A1 | 8/2014 | Rose et al. | |
| 2014/0279559 A1* | 9/2014 | Smith | G06Q 20/3227 |
| | | | 705/71 |
| 2015/0039455 A1* | 2/2015 | Luciani | G06Q 20/36 |
| | | | 705/17 |
| 2015/0186864 A1* | 7/2015 | Jones | G06Q 20/3278 |
| | | | 705/39 |
| 2016/0019536 A1* | 1/2016 | Ortiz | G06Q 20/36 |
| | | | 705/67 |
| 2016/0364729 A1* | 12/2016 | Ruparelia | G06Q 20/1085 |
| 2017/0178111 A1* | 6/2017 | Roberts | G06Q 20/349 |
| 2017/0178121 A1* | 6/2017 | Roberts | G06Q 20/20 |
| 2017/0364913 A1* | 12/2017 | Aabye | G06Q 20/32 |
| 2018/0260814 A1* | 9/2018 | Pi Farias | G06Q 20/202 |
| 2018/0268405 A1* | 9/2018 | Lopez | G06Q 20/385 |
| 2019/0005499 A1 | 1/2019 | Wall et al. | |
| 2019/0130410 A1* | 5/2019 | Nicoletti | G06Q 20/326 |
| 2019/0333053 A1* | 10/2019 | Ozvat | G06Q 30/06 |
| 2019/0340635 A1* | 11/2019 | Kumar | G06Q 20/387 |
| 2019/0370786 A1* | 12/2019 | Kasul | G06Q 20/405 |
| 2020/0118121 A1* | 4/2020 | Narang | G06Q 20/4014 |
| 2022/0393874 A1* | 12/2022 | Ngo | G09C 5/00 |

* cited by examiner

SYSTEM, METHOD, AND COMPUTER PROGRAM PRODUCT FOR CUSTOMIZING FUNCTIONS OF A POINT-OF-SALE TERMINAL

CROSS REFERENCE TO RELATED APPLICATION

The present application is a continuation application of U.S. patent application Ser. No. 16/240,948, filed Jan. 7, 2019, the disclosure of which is hereby incorporated by reference in its entirety.

BACKGROUND

1. Technical Field

Disclosed embodiments or aspects relate generally to computer user interfaces and, in one particular embodiment or aspect, to a system, method, and computer program product for customizing point-of-sale ("POS") terminal functionality for user interfaces and related to user interactions.

2. Technical Considerations

Traditionally, the customization of POS terminals (e.g., computing devices configured to interface with payment devices to complete transactions between users and merchants) is an inefficient and laborious task. For example, POS terminals may allow for customization of displayed text in a language of a card user's preference. However, to add support for the display of text in a new language, all POS terminals in a region must have their software updated, since a user may visit any one of the POS terminals in the region to complete a transaction. Similarly, if a banking institution wants to integrate a rewards program for users when they are checking out, then the programmed functionality must be pre-established for all POS terminals in the region for the program to be fully operable. As such, there are massive inefficiencies involved with changing or customizing POS terminal functionality (e.g., payment processes, rewards processes, text size and style, sound settings, types of personal information collection, custom advertisements, security settings, and/or the like).

Moreover, there may be many different varieties of POS terminals deployed in a region, where different POS terminal suppliers are in control of their own POS terminal interfaces and processes that users encounter. A user is unlikely to encounter the same customized functionality for each POS terminal unless each and every POS terminal supplier updates their POS terminals accordingly. In this manner, there are massive technical obstacles to full user customization of POS terminal functionality.

Therefore, there is a need in the art for a technical solution to provide for customizing functions of POS terminals without the requirement of POS terminals being updated or pre-programmed altogether.

SUMMARY

Accordingly, and generally, provided is an improved system, method, and computer program product for customizing functions of a point-of-sale (POS) terminal. Preferably, provided is a system, method, and computer program product for receiving payment device data from an electronic payment device of a user during a payment transaction between the user and a merchant. Preferably, provided is a system, method, and computer program product for receiving a script for execution on the POS terminal from the electronic payment device, the script associated with a digital signature. Preferably, provided is a system, method, and computer program product for verifying the script based on the digital signature. Preferably, provided is a system, method, and computer program product for executing the script on the POS terminal to cause an action associated with a user interaction with the POS terminal to be performed.

According to non-limiting embodiments or aspects, provided is a computer-implemented method for customizing functions of a POS terminal. The method includes receiving, with at least one processor, payment device data from an electronic payment device of a user during a payment transaction between the user and a merchant. The method also includes receiving, with at least one processor, at least one script for execution on the POS terminal from the electronic payment device, the at least one script associated with a digital signature. The method further includes verifying, with at least one processor, the at least one script based on the digital signature of the at least one script. The method further includes executing, with at least one processor, the at least one script on the POS terminal to cause an action associated with a user interaction with the POS terminal to be performed.

In further non-limiting embodiments or aspects, the method may include receiving, from the electronic payment device, a first set of identifiers of scripts associated with one or more types of scripts that the electronic payment device is configured to transmit. The method may also include comparing the first set of identifiers of scripts with a second set of identifiers of scripts associated with one or more types of scripts that the POS terminal is configured to execute. The method may further include communicating, to the electronic payment device, at least one identifier of scripts common to both the first set and the second set. The at least one script received from the electronic payment device may correspond to at least one payment device identifier of the electronic payment device included in the payment device data.

In further non-limiting embodiments or aspects, the method may include performing a transaction authorization process for processing the payment transaction between the user and the merchant. The method may also include displaying at least one message including at least one instruction for completing the payment transaction between the user and the merchant with the POS terminal based on executing the at least one script. The at least one instruction may be in a language specified by the at least one script received from the electronic payment device and the language may be different from a default language of the POS terminal.

In further non-limiting embodiments or aspects, the method may include communicating a payment device identifier of the electronic payment device and transaction data associated with the payment transaction between the user and the merchant to a third party server based on executing the at least one script. The method may also include receiving transaction rewards data from the third party server based on the transaction data. The method may further include displaying a user interface including at least two user options for selection, the at least two user options including a first user option to complete the payment transaction in a single payment and a second user option to complete the payment transaction in multiple payments. The method may further include communicating a transaction authorization request to complete the payment transaction, wherein the transaction authorization request includes data associated with a user selection of the first user option or data associated with a user selection of the second user option.

In further non-limiting embodiments or aspects, receiving the payment device data may include receiving a payment device identifier of the electronic payment device based on the POS terminal reading a data storage medium of the electronic payment device for completion of the payment transaction.

In further non-limiting embodiments or aspects, when executing the at least one script, at least one processor may be configured to cause the POS terminal to: (i) display at least one message; (ii) display at least one image; (iii) display at least one animation or at least one video; (iv) play at least one audio sequence; (v) display a user interface including at least one user option for selection; (vi) display at least one user data input field; (vii) communicate data to a third party server; (viii) receive data from a third party server; or any combination thereof.

According to non-limiting embodiments or aspects, provided is a system for customizing functions of a POS terminal. The system includes the POS terminal, which includes at least one processor for executing program instructions. The POS terminal is programmed and/or configured to receive payment device data from an electronic payment device of a user during a payment transaction between the user and a merchant. The POS terminal is also programmed and/or configured to receive at least one script for execution on the POS terminal from the electronic payment device, the at least one script associated with a digital signature. The POS terminal is further programmed and/or configured to verify the at least one script based on the digital signature of the at least one script. The POS terminal is further programmed and/or configured to execute the at least one script on the POS terminal to cause an action associated with a user interaction with the POS terminal to be performed.

In further non-limiting embodiments or aspects, the POS terminal may be programmed and/or configured to receive a first set of identifiers of scripts associated with one or more types of scripts that the electronic payment device is configured to transmit. The POS terminal may also be programmed and/or configured to compare the first set of identifiers of scripts with a second set of identifiers of scripts associated with one or more types of scripts that the POS terminal is configured to execute. The POS terminal may further be programmed and/or configured to communicate to the electronic payment device at least one identifier of scripts common to both the first set and the second set. The at least one script received from the electronic payment device may correspond to at least one payment device identifier of the electronic payment device included in the payment device data.

In further non-limiting embodiments or aspects, the POS terminal may be programmed and/or configured to perform a transaction authorization process for processing the payment transaction between the user and the merchant. The POS terminal may also be programmed and/or configured to communicate a payment device identifier of the electronic payment device and transaction data associated with the payment transaction between the user and the merchant to a third party server based on executing the at least one script. The POS terminal may further be programmed and/or configured to receive transaction rewards data from the third party server based on the transaction data.

In further non-limiting embodiments or aspects, the POS terminal may be programmed and/or configured to display a user interface including at least two user options for selection, the at least two user options including a first user option to complete the payment transaction in a single payment and a second user option to complete the payment transaction in multiple payments. The POS terminal may be programmed and/or configured to communicate a transaction authorization request to complete the payment transaction, wherein the transaction authorization request includes data associated with a user selection of the first user option or data associated with a user selection of the second user option.

In further non-limiting embodiments or aspects, receiving the payment device data may include receiving a payment device identifier of the electronic payment device based on the POS terminal reading a data storage medium of the electronic payment device for completion of the payment transaction.

In further non-limiting embodiments or aspects, when executing the at least one script, the at least one processor may be configured to cause the POS terminal to: (i) display at least one message; (ii) display at least one image; (iii) display at least one animation or at least one video; (iv) play at least one audio sequence; (v) display a user interface including at least one user option for selection; (vi) display at least one user data input field; (vii) communicate data to a third party server; (viii) receive data from a third party server; or any combination thereof.

According to non-limiting embodiments or aspects, provided is a computer program product for customizing functions of a POS terminal. The computer program product includes at least one non-transitory computer-readable medium including program instructions. The program instructions, when executed by at least one processor, cause the at least one processor to receive payment device data from an electronic payment device of a user during a payment transaction between the user and a merchant. The program instructions also cause the at least one processor to receive at least one script for execution on the POS terminal from the electronic payment device, the at least one script associated with a digital signature. The program instructions further cause the at least one processor to verify the at least one script based on the digital signature of the at least one script. The program instructions also cause the at least one processor to execute the at least one script on the POS terminal to cause an action associated with a user interaction with the POS terminal to be performed.

In further non-limiting embodiments or aspects, the program instructions may cause the at least one processor to receive a first set of identifiers of scripts associated with one or more types of scripts that the electronic payment device is configured to transmit. The program instructions may also cause the at least one processor to compare the first set of identifiers of scripts with a second set of identifiers of scripts associated with one or more types of scripts that the POS terminal is configured to execute. The program instructions may further cause the at least one processor to communicate to the electronic payment device at least one identifier of scripts common to both the first set and the second set. The at least one script received from the electronic payment device may correspond to at least one payment device identifier of the electronic payment device included in the payment device data.

In further non-limiting embodiments or aspects, the program instructions may cause the at least one processor to perform a transaction authorization process for processing the payment transaction between the user and the merchant.

The program instructions may also cause the at least one processor to communicate a payment device identifier of the electronic payment device and transaction data associated with the payment transaction between the user and the merchant to a third party server based on executing the at least one script. The program instructions may further cause the at least one processor to receive transaction rewards data from the third party server based on the transaction data.

In further non-limiting embodiments or aspects, the program instructions may cause the at least one processor to display a user interface including at least two user options for selection, the at least two user options including a first user option to complete the payment transaction in a single payment and a second user option to complete the payment transaction in multiple payments. The program instructions may further cause the at least one processor to communicate a transaction authorization request to complete the payment transaction, wherein the transaction authorization request includes data associated with a user selection of the first user option or data associated with a user selection of the second user option.

In further non-limiting embodiments or aspects, receiving the payment device data may include receiving a payment device identifier of the electronic payment device based on the POS terminal reading a data storage medium of the electronic payment device for completion of the payment transaction.

In further non-limiting embodiments or aspects, when executing the at least one script, the at least one processor may be configured to cause the POS terminal to: (i) display at least one message; (ii) display at least one image; (iii) display at least one animation or at least one video; (iv) play at least one audio sequence; (v) display a user interface including at least one user option for selection; (vi) display at least one user data input field; (vii) communicate data to a third party server; (viii) receive data from a third party server; or any combination thereof.

Other non-limiting embodiments or aspects of the present disclosure will be set forth in the following numbered clauses:

Clause 1: A computer-implemented method for customizing functions of a point-of-sale (POS) terminal, the method comprising: receiving, with at least one processor, payment device data from an electronic payment device of a user during a payment transaction between the user and a merchant; receiving, with at least one processor, at least one script for execution on the POS terminal from the electronic payment device, the at least one script associated with a digital signature; verifying, with at least one processor, the at least one script based on the digital signature of the at least one script; and executing, with at least one processor, the at least one script on the POS terminal to cause an action associated with a user interaction with the POS terminal to be performed.

Clause 2: The method of clause 1, further comprising: receiving, from the electronic payment device, a first set of identifiers of scripts associated with one or more types of scripts that the electronic payment device is configured to transmit; comparing the first set of identifiers of scripts with a second set of identifiers of scripts associated with one or more types of scripts that the POS terminal is configured to execute; and communicating, to the electronic payment device, at least one identifier of scripts common to both the first set and the second set; wherein the at least one script received from the electronic payment device corresponds to at least one payment device identifier of the electronic payment device included in the payment device data.

Clause 3: The method of clause 1 or 2, further comprising performing a transaction authorization process for processing the payment transaction between the user and the merchant.

Clause 4: The method of any of clauses 1-3, further comprising: displaying at least one message comprising at least one instruction for completing the payment transaction between the user and the merchant with the POS terminal based on executing the at least one script; wherein the at least one instruction is in a language specified by the at least one script received from the electronic payment device and the language is different from a default language of the POS terminal.

Clause 5: The method of any of clauses 1-4, further comprising: communicating a payment device identifier of the electronic payment device and transaction data associated with the payment transaction between the user and the merchant to a third party server based on executing the at least one script; and receiving transaction rewards data from the third party server based on the transaction data.

Clause 6: The method of any of clauses 1-5, further comprising: displaying a user interface comprising at least two user options for selection, the at least two user options comprising a first user option to complete the payment transaction in a single payment and a second user option to complete the payment transaction in multiple payments; and communicating a transaction authorization request to complete the payment transaction, wherein the transaction authorization request comprises data associated with a user selection of the first user option or data associated with a user selection of the second user option.

Clause 7: The method of any of clauses 1-6, wherein receiving the payment device data comprises receiving a payment device identifier of the electronic payment device based on the POS terminal reading a data storage medium of the electronic payment device for completion of the payment transaction.

Clause 8: The method of any of clauses 1-7, wherein, when executing the at least one script, at least one processor is configured to cause the POS terminal to: display at least one message; display at least one image; display at least one animation or at least one video; play at least one audio sequence; display a user interface comprising at least one user option for selection; display at least one user data input field; communicate data to a third party server; receive data from a third party server; or any combination thereof.

Clause 9: A system for customizing functions of a point-of-sale (POS) terminal, the system comprising the POS terminal comprising at least one processor for executing program instructions, the POS terminal being programmed and/or configured to: receive payment device data from an electronic payment device of a user during a payment transaction between the user and a merchant; receive at least one script for execution on the POS terminal from the electronic payment device; and execute the at least one script on the POS terminal to cause an action associated with a user interaction with the POS terminal to be performed based on verifying the at least one script.

Clause 10: The system of clause 9, wherein the POS terminal is further programmed and/or configured to: receive a first set of identifiers of scripts associated with one or more types of scripts that the electronic payment device is configured to transmit; compare the first set of identifiers of scripts with a second set of identifiers of scripts associated with one or more types of scripts that the POS terminal is configured to execute; and communicate to the electronic payment device at least one identifier of scripts common to both the first set and the second set; wherein the at least one script received from the electronic payment device corresponds to at least one payment device identifier of the electronic payment device included in the payment device data.

Clause 11: The system of clause 9 or 10, wherein the POS terminal is further programmed and/or configured to: perform a transaction authorization process for processing the payment transaction between the user and the merchant; communicate a payment device identifier of the electronic payment device and transaction data associated with the payment transaction between the user and the merchant to a third party server based on executing the at least one script; and receive transaction rewards data from the third party server based on the transaction data.

Clause 12: The system of any of clauses 9-11, wherein the POS terminal is further programmed and/or configured to: display a user interface comprising at least two user options for selection, the at least two user options comprising a first user option to complete the payment transaction in a single payment and a second user option to complete the payment transaction in multiple payments; and communicate a transaction authorization request to complete the payment transaction, wherein the transaction authorization request comprises data associated with a user selection of the first user option or data associated with a user selection of the second user option.

Clause 13: The system of any of clauses 9-12, wherein receiving the payment device data comprises receiving a payment device identifier of the electronic payment device based on the POS terminal reading a data storage medium of the electronic payment device for completion of the payment transaction.

Clause 14: The system of any of clauses 9-13, wherein, when executing the at least one script, the at least one processor is configured to cause the POS terminal to: display at least one message; display at least one image; display at least one animation or at least one video; play at least one audio sequence; display a user interface comprising at least one user option for selection; display at least one user data input field; communicate data to a third party server; receive data from a third party server; or any combination thereof.

Clause 15: A computer program product for customizing functions of a point-of-sale (POS) terminal, the computer program product comprising at least one non-transitory computer-readable medium including program instructions that, when executed by at least one processor, cause the at least one processor to: receive payment device data from an electronic payment device of a user during a payment transaction between the user and a merchant; receive at least one script for execution on the POS terminal from the electronic payment device; verify the at least one script; and execute the at least one script on the POS terminal to cause an action associated with a user interaction with the POS terminal to be performed.

Clause 16: The computer program product of clause 15, wherein the program instructions further cause the at least one processor to: receive a first set of identifiers of scripts associated with one or more types of scripts that the electronic payment device is configured to transmit; compare the first set of identifiers of scripts with a second set of identifiers of scripts associated with one or more types of scripts that the POS terminal is configured to execute; and communicate to the electronic payment device at least one identifier of scripts common to both the first set and the second set; wherein the at least one script received from the electronic payment device corresponds to at least one payment device identifier of the electronic payment device included in the payment device data.

Clause 17: The computer program product of clause 15 or 16, wherein the program instructions further cause the at least one processor to: perform a transaction authorization process for processing the payment transaction between the user and the merchant; communicate a payment device identifier of the electronic payment device and transaction data associated with the payment transaction between the user and the merchant to a third party server based on executing the at least one script; and receive transaction rewards data from the third party server based on the transaction data.

Clause 18: The computer program product of any of clauses 15-17, wherein the program instructions further cause the at least one processor to: display a user interface comprising at least two user options for selection, the at least two user options comprising a first user option to complete the payment transaction in a single payment and a second user option to complete the payment transaction in multiple payments; and communicate a transaction authorization request to complete the payment transaction, wherein the transaction authorization request comprises data associated with a user selection of the first user option or data associated with a user selection of the second user option.

Clause 19: The computer program product of any of clauses 15-18, wherein receiving the payment device data comprises receiving a payment device identifier of the electronic payment device based on the POS terminal reading a data storage medium of the electronic payment device for completion of the payment transaction.

Clause 20: The computer program product of any of clauses 15-19, wherein, when executing the at least one script, the at least one processor is configured to cause the POS terminal to: display at least one message; display at least one image; display at least one animation or at least one video; play at least one audio sequence; display a user interface comprising at least one user option for selection; display at least one user data input field; communicate data to a third party server; receive data from a third party server; or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
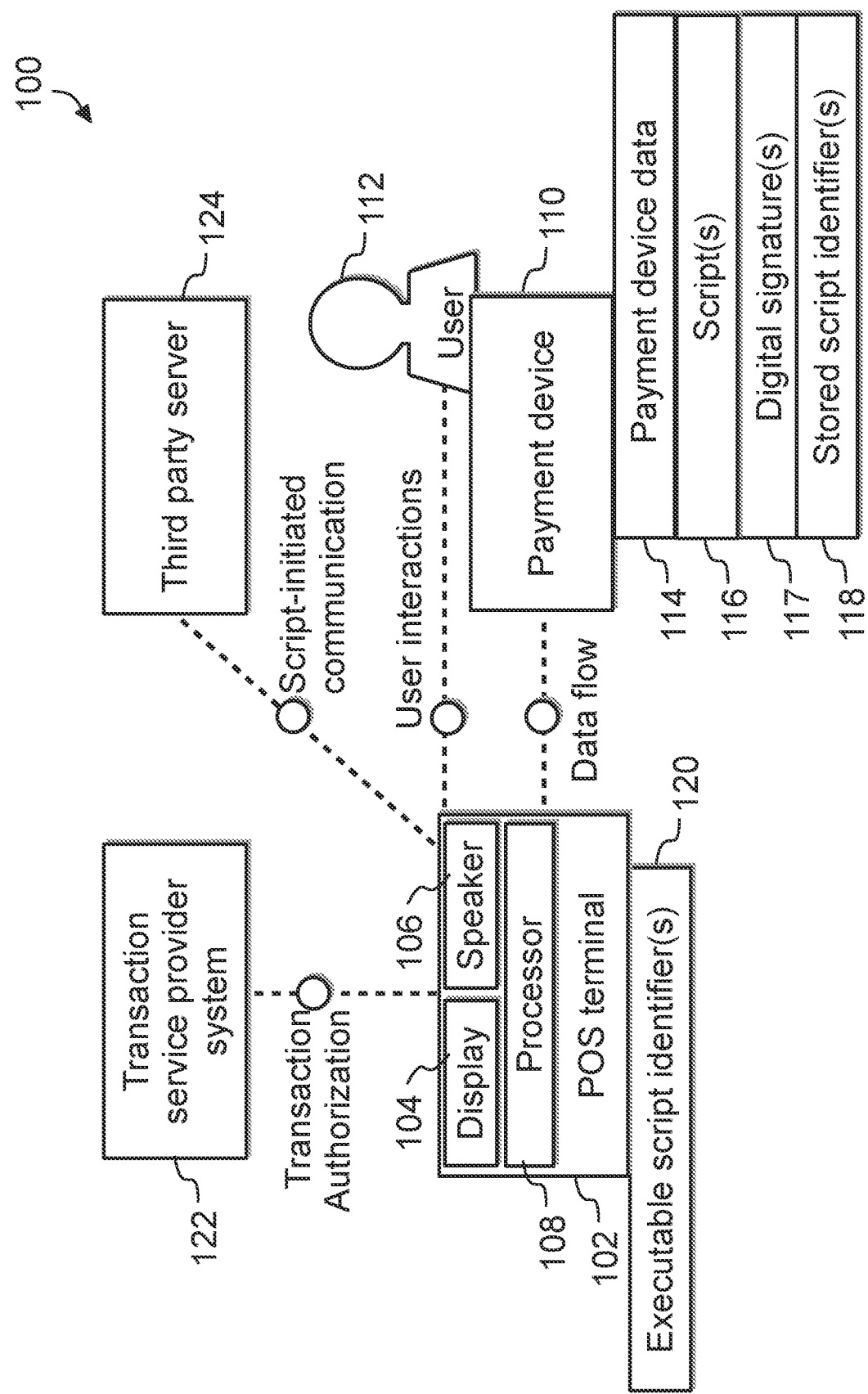
FIG. 1 is a schematic diagram of one embodiment or aspect of a system for customizing functions of a point-of-sale (POS) terminal.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the illustrated embodiments are not to be interpreted as limiting and may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments, a message may refer to a packet (e.g., a data packet, a network packet, and/or the like) that includes data.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a personal account number (PAN), to a user that uniquely identifies one or more accounts associated with the user. The account identifier may be used by the user to conduct a payment transaction. In some non-limiting embodiments, an issuer may be associated with a bank identification number (BIN) that uniquely identifies the issuer. As used herein "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The terms "point-of-sale system," "POS system," or "POS terminal," as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction. A POS terminal may be located proximal to a user, such as at a physical store location, or a POS terminal may be remote from the user, such as a server interacting with a user browsing on their personal computer. POS terminals may include mobile devices.

As used herein, the term "account identifier" may refer to one or more types of identifiers associated with an account (e.g., a unique identifier of an account, an account number, a PAN, a card number, a payment card number, a token, and/or the like) of a user. In some non-limiting embodiments, an issuer may provide an account identifier to a user that uniquely identifies one or more accounts associated with that user. In some non-limiting embodiments, an account identifier may be embodied on a payment device (e.g., a payment card, a credit card, a debit card, and/or the like) and/or may be electronic information communicated to the user that the user may use for electronic payment transactions. In some non-limiting embodiments, an account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten by the user, stolen from the user, and/or the like, a supplemental account identifier may be provided to the user. In some non-limiting embodiments, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "account token" may refer to an identifier that is used as a substitute or replacement identifier for an account identifier, such as a PAN. An account token may be used as a substitute or replacement identifier for an original account identifier, such as a PAN. Account tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of account tokens for different individuals or purposes. In some non-limiting embodiments, account tokens may be associated with a PAN or other account identifiers in one or more data structures such that they can be used to conduct a transaction without directly using the account identifier, such as a PAN. In some examples, an account identifier, such as a PAN, may be associated with a plurality of account tokens for different uses or different purposes.

As used herein, the term "computing device" may refer to one or more electronic devices that include one or more processors. A computing device may be a stationary computer or a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also include components to send, receive, and/or process data, such as but not limited to memory, a display device, an input device, a network interface, and/or the like.

As used herein, the term "payment device" may refer to a payment card, such as a credit card, a debit card, a charge card, a gift card, a payroll card, and/or the like, associated with an account identifier of a payment account. In some non-limiting embodiments, a payment device may include an electronic payment device, such as a smartcard, a chip card, integrated circuit card, and/or the like. An electronic payment device may include an embedded integrated circuit and the embedded integrated circuit may include a data storage medium (e.g., volatile and/or non-volatile memory) to store information associated with the payment device, such as an account identifier, a name of the account holder, and/or the like.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more devices, such as one or more processors, servers, and computing devices that include software applications, and/or the like.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

Non-limiting embodiments or aspects of the present disclosure are directed to a system, method, and computer program product for customizing functions of a point-of-sale (POS) terminal. Described embodiments and aspects improve upon prior art technical solutions by removing the need for pre-programmed software updates to be pushed to all POS terminals in a given region of operation. By the embodiments and aspects of the technical solutions described herein, the functionality of POS terminals can be customized (e.g., visually, aurally, procedurally, etc.) at the time of user interaction (e.g., pressing a button, touching a screen, viewing an image, reading a message, hearing a sound, and/or the like) via scripts stored on and communicated from payment device of a user. Moreover, existing payment device authentication and transaction processes can be augmented by script validation and execution processes, whereby POS terminals can verify the authenticity and/or the security of scripts, determine whether scripts are executable on the current POS terminal, and execute the custom POS terminal functions at run-time. Accordingly, the variety and range of customized functionality and user interfaces is greatly improved, the software upkeep for POS terminals is reduced, and the speed in which custom functions are loaded/executed may be increased by initiating the customization during the initial data exchange between a payment device and the POS terminal. These improvements, among others, are detailed by the further disclosure below.

With specific reference to FIG. 1, and in non-limiting embodiments or aspects, provided is a system 100 for customizing functions of a point-of-sale (POS) terminal. The system 100 includes a POS terminal 102 that may include a display 104 (e.g., a screen), a speaker 106, and at least one processor 108. The POS terminal 102 may be associated with a merchant and communicate with a payment device 110 (e.g., an electronic payment device) of a user 112 to complete a transaction between the user 112 and the merchant. The payment device 110 may store payment device data 114, including, but not limited to, an account identifier, an account token, an account holder name, a payment device type, and/or the like. The payment device 110 may also store at least one script 116 (e.g., a set of computer-readable instructions for execution by one or more processors) that is configured to customize an existing function of the POS terminal 102 or cause the execution of a custom POS terminal 102 function. For example, existing POS terminal functions that may be customized may include, but are not limited to, the display of a total price, the playing of sound to represent transaction status, the form of acceptable functional input, the display of a cashback interface, the display of transaction processing status, etc. For the example of the display of a total price, said existing function may be customized by changing the size/style of the font text, by sounding the price aloud via a speaker 106, by displaying the text in a different language, by displaying the price in a different currency, by displaying the amount of tax separately, and/or the like.

Custom POS terminal functions may include, but are not limited to, the display of a payment-device related rewards interface (e.g., to show points earned, to allow for point redemption, etc.), the playing of an audio sequence such as a tune to signify transaction completion, the display of an interface to allow a user to select how payments will be made (e.g., single payment, multiple payments, etc.), and/or the like. In view of these non-limiting examples, it will be appreciated that scripts 116 may provide for customized POS terminal functions through any combination of displaying at least one message, displaying at least one image, displaying at least one animation or at least one video, playing at least one audio sequence, displaying a user interface comprising at least one user option for selection, displaying at least one user data input field, communicating data to a third party server, receiving data from a third party server, and/or the like.

With further reference to FIG. 1, and in further non-limiting embodiments or aspects, the payment device 110 may store one or more digital signatures 117 corresponding to the one or more scripts 116. A digital signature 117 (e.g., a one-way hash encryption of a script 116, passcodes, asymmetric cryptographic keys, and/or the like) may serve to authenticate the user 112, a script 116, and/or the like. The payment device 110 may further store a set of stored script identifiers 118, which may identify one or more types of scripts 116 that the payment device 110 is storing/capable of transmitting. A script 116 type may be with regard to type of display/audio settings, third party communications, programming language, issuer institution program, script size, and/or the like. The POS terminal 102 may be likewise programmed and/or configured to store a set of executable script identifiers 120, which may identify one or more types of scripts 116 that the POS terminal 102 is capable of executing. A "set," as used herein, may contain zero or more elements (so as to include a null or empty set).

The POS terminal 102 may receive from the payment device 110 a set of stored script identifiers 118 and compare the set of stored script identifiers 118 to the set of executable script identifiers 120 to determine a set of script identifiers that are common to both sets. The POS terminal 102 may communicate the common script identifiers, if any, to the payment device 110, in response to which the payment device 110 may communicate to the POS terminal 102 the scripts 116 corresponding to the common script identifiers. Alternatively, the POS terminal 102 may receive all of the scripts 116 from the payment device 110 but use the comparison of the set of stored script identifiers 118 and the executable script identifiers 120 to determine which scripts 116 to run.

With further reference to FIG. 1, and in further non-limiting embodiments or aspects, the system 100 may include a transaction service provider system 122 communicatively connected to the POS terminal 102. The POS terminal 102 may communicate transaction authorization requests to the transaction service provider system 122 to complete a transaction between the payment device 110 and the POS terminal 102. If an executed script 116 received from the payment device 110 includes instructions related to the completion of a transaction, script-related payment data may be embedded in the transaction authorization request. For example, if the script 116 causes the display of a payment method option screen for selection by the user (e.g., single payment, multiple payments, multiple accounts, etc.), data of the user's selection may be embedded in the transaction authorization request and acted on by the transaction service provider system 122, an issuer institution server, and/or the like.

The system 100 may further include a third party server 124 communicatively connected to the POS terminal 102, such as by a distributed data network connection (e.g., an internet connection). An executed script 116 received from the payment device 110 that includes instructions related to sending and/or receiving data from the third party server 124 may cause the POS terminal 102 to communicate with the third party server 124 accordingly. For example, the script 116 may include instructions to communicate an identifier of the user 112 to the third party server 124 and to receive back data related to a rewards or incentive program associated with the payment device 110, further causing the POS terminal 102 to display a rewards redemption/status interface to the user 112. The user's 112 selection may then be communicated back to the third party server 124. Third party data may also include the promotion of products or services from merchants or issuers (e.g., an advertisement to make a purchase), notifications of credit limit use (e.g., "You have used 95% of your credit limit"), and/or other like communications.

With further reference to FIG. 1, and in further non-limiting embodiments or aspects, the script 116 may be configured to cause a message to be displayed on a display 104 of the POS terminal 102. For example, the script 116 may include: "<script> <display> veuillez retirer la carte </display> <signature> 0EF5DA34 </signature> </script>."

Such a script 116 may be communicated to the POS terminal 102 after all the payment device data 114 is communicated from the payment device 110. This example script 116 includes an embedded digital signature 117 and is in markup language, but it will be appreciated that many arrangements, combinations, and types of computer instruction languages may be used, including, but not limited to, compiled languages (e.g., C, C++, C #, Python, Haskell, etc.), concurrent languages (e.g., Java, Ada, E, etc.), declarative languages (e.g., SQL, Mercury, etc.), embeddable languages (e.g., PHP, JavaScript, etc.), and/or the like. After verifying the "<signature>" element of the script, the POS terminal 102 displays "veuillez retirer la carte" on the screen, which is a French translation of "please remove card." In this manner, one or more functions of the POS terminal 102 are customized, without the POS terminal 102 being programmed to communicate in French or to pre-determine what kind of text is to be displayed in French for a given user interaction.

With further reference to FIG. 1, and in further non-limiting embodiments or aspects, the script 116 may be configured to trigger a cashback feature associated with the issuer institution of the payment device 110. For example, the script 116 may include a call to a third party server 124 within a message: "<script> <display> You get <get> https://bank.com/cardscriptservice/cashbackamount/ DA287712 </get> cashback in this transaction!</display> <signature>0EF5DA34</signature> </script>". After verifying the digital signature 117 of the script 116 (in the "<signature>" tag), which is embedded in the URL of the script 116, the POS terminal 102 may communicate with a third party server 124 (e.g., a remote endpoint) to transmit an identifier of the user 112 (e.g., "DA287712," embedded in the URL"). The third party server 124 may then communicate back a response based on the user 112 identifier, e.g., a cashback reward corresponding to the transaction, such as $2.32. Therefore, the POS terminal 102 would display a message of "You get $2.32 cashback in this transaction!" on the display 104.

With further reference to FIG. 1, and in further non-limiting embodiments or aspects, the script 116 may be configured to trigger a custom POS terminal function to allow a user to select a payment method, such as by installment payments via the issuer institution of the payment device 110. For example, the script 116 may include: "<script> <menu> <target> card </target> <menu_header> How do you want to pay? </menu_header> <menu_item> <id>1</id> <menu_text> Full amount </menu_text> <menu_item> <id>2</id> <menu_text>3 months installments </menu_text> </menu_item> </menu> <signature>0EF5DA34</signature> </script>". After verifying the digital signature 117 of script 116 (e.g., embedded in the "<signature>" tag of the script 116), the POS terminal 102 may display a menu on the screen:

TABLE 1

| How do you want to pay? |
| --- |
| 1. Full amount |
| 2. 3 Months installments |

After the user 112 selects an option, e.g., option (2), using an input of the POS terminal 102 (e.g., a keypad, a touch screen, etc.), the POS terminal 102 may embed the selection in a transaction authorization request, or it may communicate the selection to the payment device 110 for the payment device 110 to embed the payment type into the payment data to be communicated to the POS terminal 102. After completing the foregoing script 116, the transaction would be completed according to the user's 112 selection.

Figure 2:
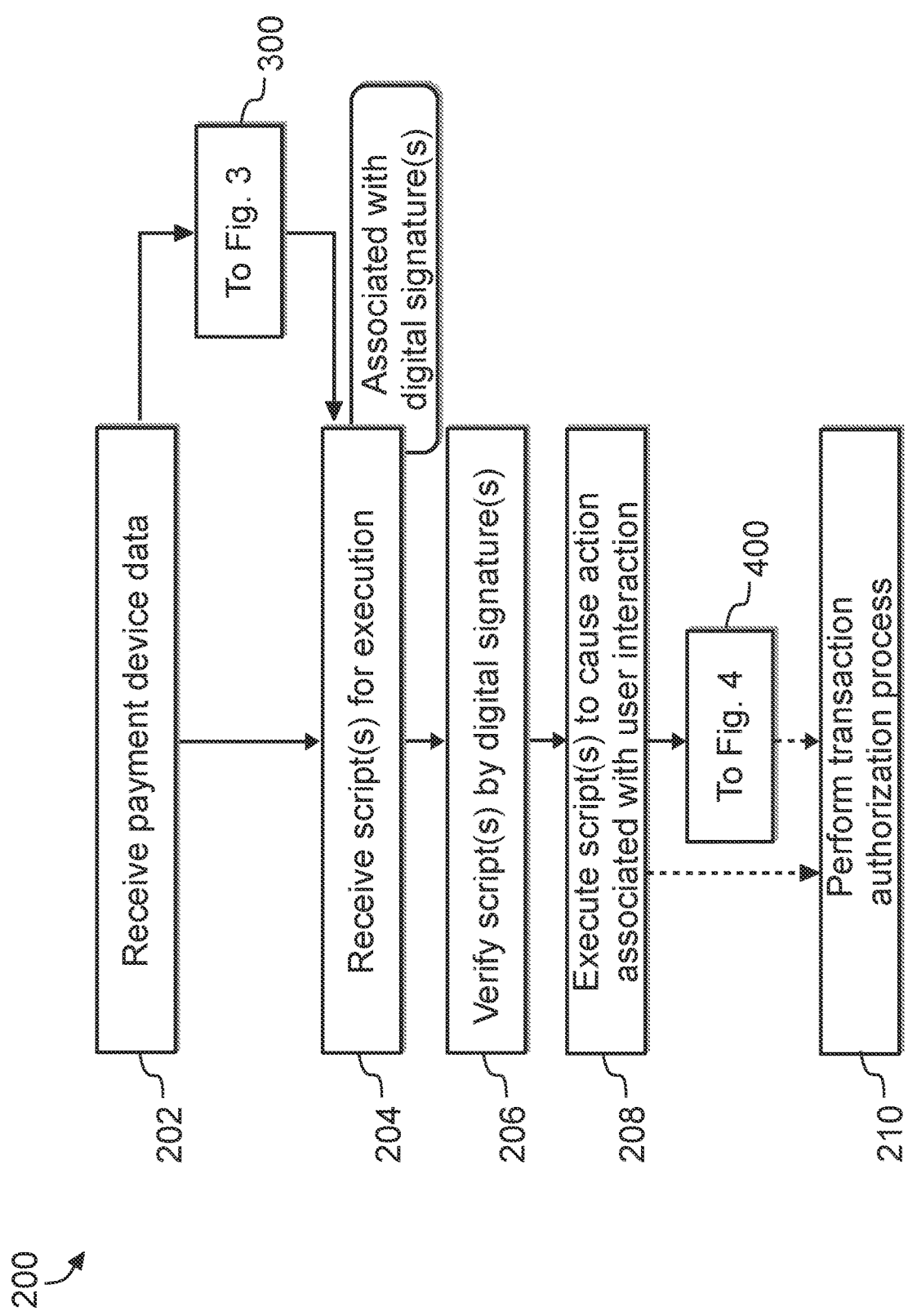
FIG. 2 is a process diagram of one embodiment or aspect of a system for customizing functions of a point-of-sale (POS) terminal.

With specific reference to FIG. 2, and in non-limiting embodiments or aspects, provided is a method 200 for customizing functions of a POS terminal. The method 200 may be performed by one or more processors of the POS terminal, and one or more of the steps therein may be performed by processors communicatively connected to the POS terminal, such as a checkout computer terminal, a vendor server, a network modem, and/or the like. In step 202, payment device data is received based on the POS terminal from a payment device of a user during a transaction, such as a payment transaction, between the user and a merchant. The payment transaction may include any and all steps from when a user decides to engage in an exchange with a merchant until the exchange is completed. The payment device data may include a payment device identifier, such as a credit card number, which may be encrypted.

Figure 3:
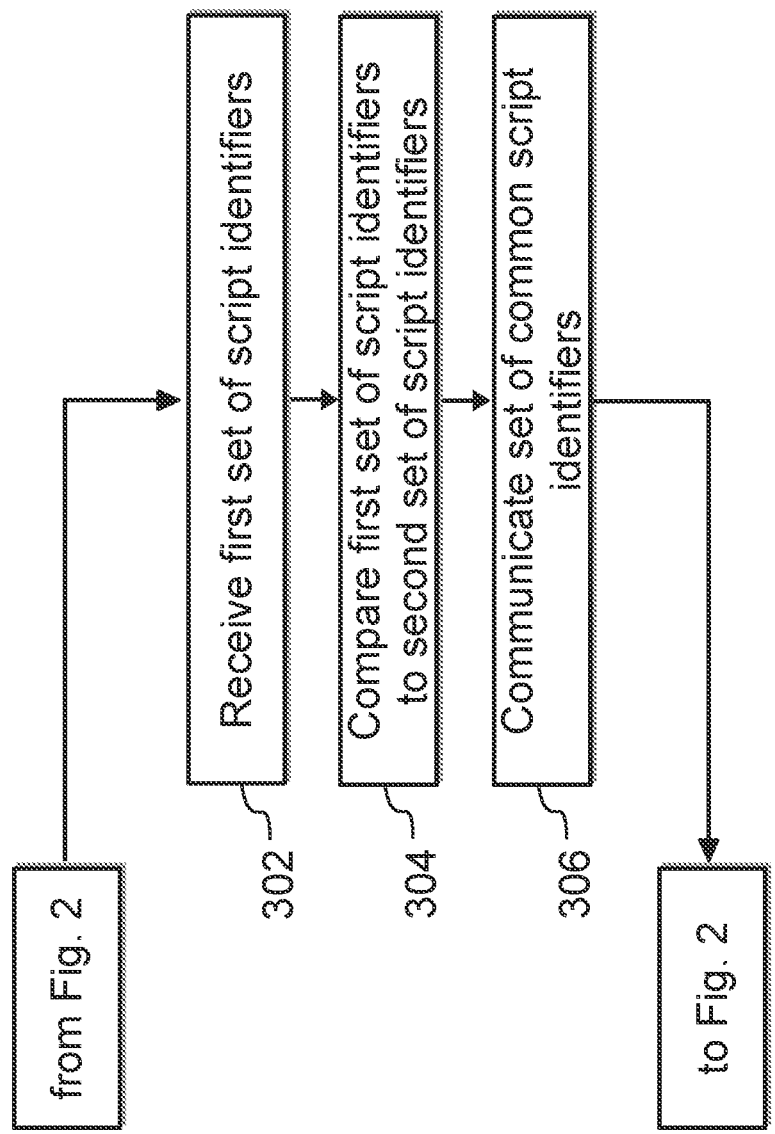
FIG. 3 is a process diagram of one embodiment or aspect of a system for customizing functions of a point-of-sale (POS) terminal.

The method 200 may further include a script check process 300, as further shown in FIG. 3. In step 204, one or more scripts are received from the payment device for execution on the POS terminal. The scripts may be associated with digital signatures to authenticate/verify one or more of the following parameters of the script: the contents of the script, the script type, the payment device, the user, or any combination thereof.

In step 206, the script may be verified by the POS terminal at least partially based on the digital signature associated with the script. For example, the POS terminal may use a public key of a cryptographic digital signature to verify the script. In step 208, the script may be executed on the POS terminal to cause one or more actions associated with a user interaction with the POS terminal. User interactions for which POS terminal functions may be customized include, but are not limited to, inputting personal user data, inputting information for a payment process, viewing status of payment, viewing and interacting with advertisements, viewing and interacting with offers/rewards, selecting payment options, selecting receipt options, reading messages, observing visual/audio feedback from the POS terminal, and/or the like.

Non-limiting embodiments or aspects of such actions are further described in connection with FIG. 4 via an illustrative script execution process 400. Ultimately, the POS terminal may perform a transaction authorization process, in step 210, to complete the transaction between the user and the merchant. Step 210 may include generating and communicating, by the POS terminal, a transaction authorization request to a transaction service provider system, which may include payment device data (e.g., a payment device identifier), and which may include additional data derived from the script-initiated actions (e.g., user input).

With specific reference to FIG. 3, and in non-limiting embodiments or aspects, the method of customizing functions of a POS terminal may include a script check process 300. The script check process 300 may be performed by one or more processors of the POS terminal, and one or more of the steps therein may be performed by processors communicatively connected to the POS terminal, such as a checkout computer terminal, a vendor server, a network modem, and/or the like. The script check process 300 may include, at step 302, receiving, with the POS terminal, a first set of identifiers of scripts associated with one or more types of scripts that a payment device (e.g., an electronic payment device) is configured to transmit. For example, the payment device may have three scripts stored thereon, related to a type of audio sequence action (e.g., playing a foreign language audio message), a type of third party-data action (e.g., initiating a cashback process interface), and a type of display action (e.g., displaying an advertisement). The payment device may communicate three identifiers to the POS terminal corresponding to the three types of scripts it is configured to transmit.

In step 304, the first set of identifiers may be compared by the POS terminal to a second set of identifiers of scripts associated with one or more types of scripts that the POS terminal is configured to execute. For example, the POS terminal may be equipped with a screen and a data connection to a third party server, and therefore it may have a set of script identifiers associated with display actions, third-party data actions, and/or the like. However, if the POS terminal does not have a speaker, it may not be able to play audio sequences, and therefore the second set of script identifiers would not include such an audio-related script identifier. In step 306, a set of common script identifiers, corresponding to script identifiers common to both the first set and second set, may be determined and communicated to the payment device, so that scripts relating to the common script identifiers may be communicated to the POS terminal for execution. It will be appreciated that script identifiers may also relate to other parameters besides general categories of script types including, but not limited to, script languages, script authors, script size, unique script ID, and/or the like.

Figure 4:
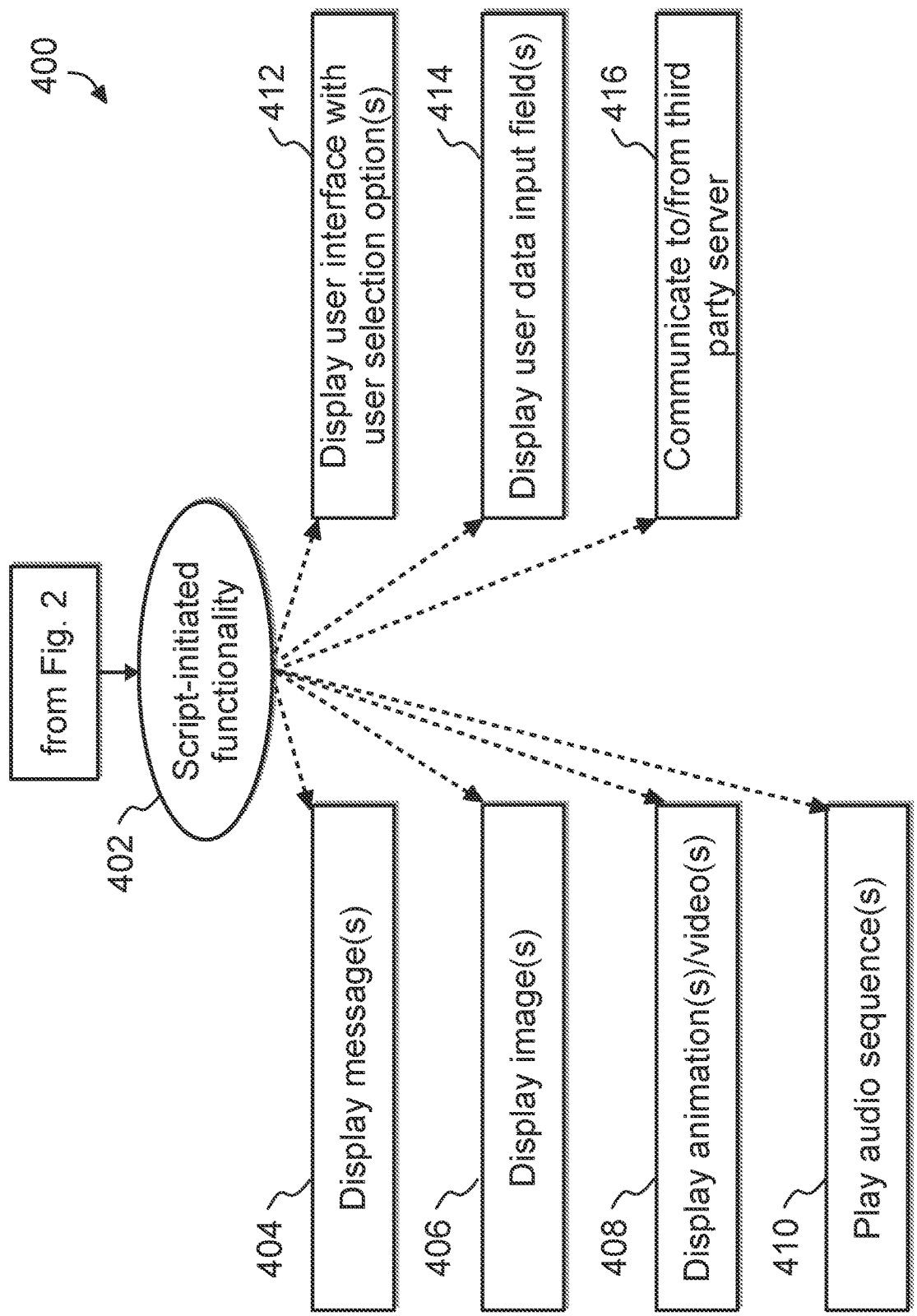
FIG. 4 is a process diagram of one embodiment or aspect of a system for customizing functions of a point-of-sale (POS) terminal.

With specific reference to FIG. 4, and in non-limiting embodiments or aspects, the method of customizing functions of a POS terminal may include a script execution process 400. The script execution process 400 may be performed by one or more processors of the POS terminal, and one or more of the steps therein may be performed by processors communicatively connected to the POS terminal, such as a checkout computer terminal, a vendor server, a network modem, and/or the like. In step 402, the POS terminal may cause, in response to executing one or more scripts, an action associated with a user interaction with the POS terminal to be performed. In non-limiting embodiments or aspects, the action may include one or more customized functions (e.g., POS terminal actions) to be carried out. Script-initiated functionality may include, but is not limited to, displaying a message (step 404), displaying an image (step 406), displaying an animation or video (step 408), playing an audio sequence (step 410), displaying a user interface with options for user selection (step 412), displaying a data input field for user input (step 414), communicating data to/from a third party server (step 416), or any combination thereof. Any given script-initiated functionality may include one or more of the foregoing steps.

Step 404 may include, for example, displaying at least one message on the POS terminal including an instruction for completing the payment transaction, such as "Press 'OK' to confirm amount," "Enter PIN," "Submit payment," and/or the like. The message of step 404 may be in a language specified by a script that is the same or different from the default language of the POS terminal. For example, the POS terminal may be programmed and/or configured to display messages in English, but the script, when executed, may display messages in another language, e.g., French. Because the system does not require the POS terminal to be pre-programmed with script operations, the script can customize messages to be displayed in any necessary format, style, size, or language.

Step 414 may include, for example, displaying a user interface on the POS terminal including at least two options for selection (e.g., control buttons, touchscreen icons, etc.) including a first user option to complete the payment transaction in a single payment and a second user option to complete the payment transaction in multiple payments. Additional options or messages may be provided to specify the type of multiple payments (e.g., two payments over two months, four payments every quarter year with interest, etc.). The POS terminal may then modify a transaction authorization process, as in step 210 of FIG. 2, particularly as initiated by the script, to communicate a transaction authorization request having data associated with the user selection of the first user option or the second user option. For example, if the user selects a multiple payments option, such as two payments over two months, data regarding that selection may be embedded in the transaction authorization request, which may be used by an issuer institution to control the use of funds of the user's account.

Step 416 may include, for example, communicating transaction data and/or payment device data, including a payment device identifier, from the POS terminal to a third party server. The third party server may use the transaction data and payment device data to update spending records (e.g., for rewards programs, offer programs, fraud analysis, market analysis, or other spend-tracking services). The third party server may then generate data for communication back to the POS terminal, which may then be provided to the user interacting with the POS terminal. For example, the third party server may receive the transaction data and payment device data for a rewards program associated with the user and/or the payment device. For a rewards program where the user earns $1 cashback for every $100 spent, and for a transaction where the user is making a $52 purchase, the third party server may determine that the user has earned a $0.52 cashback reward. The third party server may then transmit transaction rewards data to the POS terminal for presentation to the user. Transaction rewards data may include cashback, discounts, third party partial payment, electronic badges/achievements, gift redemptions, and/or the like. The user may then interact with the POS terminal, if required, to choose a reward, check a reward status, delay receiving a reward, and/or the like. For the above illustration, the user may choose to redeem the $0.52 reward or save the $0.52 reward to continuing building up their reward earnings.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
receiving, with at least one processor of a point-of-sale (POS) terminal and during a payment transaction between a user and a merchant, a first set of identifiers of scripts associated with one or more types of scripts from an electronic payment device of the user, wherein the one or more types of scripts are associated with one or more scripts that the electronic payment device is configured to transmit;

comparing, with at least one processor of the POS terminal, the first set of identifiers of scripts with a second set of identifiers of scripts associated with one or more types of scripts that the POS terminal is configured to execute;

communicating, with at least one processor of the POS terminal, at least one identifier of scripts common to both the first set and the second set to the electronic payment device;

receiving at least one script for execution on the POS terminal from the electronic payment device, the at least one script associated with a digital signature;

verifying the at least one script based on the digital signature of the at least one script; and executing the at least one script on the POS terminal to cause an action associated with a user interaction with the POS terminal to be performed.

2. The method of claim 1, further comprising:
performing a transaction authorization process for processing the payment transaction between the user and the merchant.

3. The method of claim 1, further comprising:
displaying at least one message comprising at least one instruction for completing the payment transaction between the user and the merchant with the POS terminal based on executing the at least one script,
wherein the at least one instruction is in a language specified by at least one script received from the electronic payment device and the language is different from a default language of the POS terminal.

4. The method of claim 1, further comprising:
communicating a payment device identifier of the electronic payment device and transaction data associated with the payment transaction between the user and the merchant to a third party server based on executing the at least one script; and
receiving transaction rewards data from the third party server based on the transaction data.

5. The method of claim 1, further comprising:
displaying a user interface comprising at least two user options for selection, the at least two user options comprising a first user option to complete the payment transaction in a single payment and a second user option to complete the payment transaction in multiple payments; and
communicating a transaction authorization request to complete the payment transaction, wherein the transaction authorization request comprises data associated with a user selection of the first user option or data associated with a user selection of the second user option.

6. The method of claim 1, further comprising:
receiving a payment device identifier of the electronic payment device based on the POS terminal reading a data storage medium of the electronic payment device for completion of the payment transaction.

7. The method of claim 1, wherein, when executing the at least one script, at least one processor is configured to cause the POS terminal to:
display at least one message;
display at least one image;
display at least one animation or at least one video;
play at least one audio sequence;
display a user interface comprising at least one user option for selection;
display at least one user data input field;
communicate data to a third party server;
receive data from a third party server; or
any combination thereof.

8. A system for customizing functions of a point-of-sale (POS) terminal, the system comprising the POS terminal comprising at least one processor for executing program instructions, wherein the at least one processor is programmed or configured to:
receive, during a payment transaction between a user and a merchant, a first set of identifiers of scripts associated with one or more types of scripts from an electronic payment device of the user, wherein the one or more types of scripts are associated with one or more scripts that the electronic payment device is configured to transmit;
compare the first set of identifiers of scripts with a second set of identifiers of scripts associated with one or more types of scripts that the POS terminal is configured to execute;
communicate at least one identifier of scripts common to both the first set and the second set to the electronic payment device;
receive at least one script for execution on the POS terminal from the electronic payment device, the at least one script associated with a digital signature;
verify the at least one script based on the digital signature of the at least one script; and
execute the at least one script on the POS terminal to cause an action associated with a user interaction with the POS terminal to be performed.

9. The system of claim 8, wherein the at least one processor is further programmed or configured to:
perform a transaction authorization process for processing the payment transaction between the user and the merchant.

10. The system of claim 8, wherein the at least one processor is further programmed or configured to:
display at least one message comprising at least one instruction for completing the payment transaction between the user and the merchant with the POS terminal based on executing the at least one script; and
wherein the at least one instruction is in a language specified by at least one script received from the electronic payment device and the language is different from a default language of the POS terminal.

11. The system of claim 8, wherein the at least one processor is further programmed or configured to:
display a user interface comprising at least two user options for selection, the at least two user options comprising a first user option to complete the payment transaction in a single payment and a second user option to complete the payment transaction in multiple payments; and
communicate a transaction authorization request to complete the payment transaction, wherein the transaction authorization request comprises data associated with a user selection of the first user option or data associated with a user selection of the second user option.

12. A computer program product for customizing functions of a point-of-sale (POS) terminal, the computer program product comprising at least one non-transitory computer-readable medium including program instructions that, when executed by at least one processor of the POS terminal, cause the at least one processor of the POS terminal to:
receive, during a payment transaction between a user and a merchant, a first set of identifiers of scripts associated with one or more types of scripts from an electronic payment device of the user, wherein the one or more types of scripts are associated with one or more scripts that the electronic payment device is configured to transmit;
compare the first set of identifiers of scripts with a second set of identifiers of scripts associated with one or more types of scripts that the POS terminal is configured to execute;
communicate at least one identifier of scripts common to both the first set and the second set to the electronic payment device;
receive at least one script for execution on the POS terminal from the electronic payment device, the at least one script associated with a digital signature;
verify the at least one script based on the digital signature of the at least one script; and
execute the at least one script on the POS terminal to cause an action associated with a user interaction with the POS terminal to be performed.

13. The computer program product of claim 12, wherein the program instructions further cause the at least one processor to:
perform a transaction authorization process for processing the payment transaction between the user and the merchant.

14. The computer program product of claim 12, wherein the program instructions further cause the at least one processor to:
display at least one message comprising at least one instruction for completing the payment transaction between the user and the merchant with the POS terminal based on executing the at least one script; and
wherein the at least one instruction is in a language specified by at least one script received from the electronic payment device and the language is different from a default language of the POS terminal.

* * * * *